US005685679A

United States Patent [19]
Sugiura

[11] Patent Number: 5,685,679
[45] Date of Patent: Nov. 11, 1997

[54] TIGHTENING TYPE CONNECTOR HAVING DIFFERENT SIZE NUTS

[75] Inventor: Tomohiro Sugiura, Shizuoka-ken, Japan

[73] Assignee: Yazaki Corporation, Tokyo, Japan

[21] Appl. No.: 624,359

[22] Filed: Apr. 11, 1996

[30] Foreign Application Priority Data

Apr. 13, 1995 [JP] Japan .................................... 7-088050

[51] Int. Cl.[6] .......................... F16B 37/00; H01H 85/24; H01R 13/68; H01R 33/95

[52] U.S. Cl. .......................... 411/104; 337/263; 439/622

[58] Field of Search ................................ 411/84, 85, 104, 411/432; 439/621, 622; 337/198, 255, 263, 264, 201; 453/50, 51, 52

[56] References Cited

U.S. PATENT DOCUMENTS

| | | | |
|---|---|---|---|
| 2,408,751 | 10/1946 | Breiter et al. | 453/50 |
| 4,948,313 | 8/1990 | Zankovich | 411/85 |

FOREIGN PATENT DOCUMENTS

| | | |
|---|---|---|
| 4-54417 | 5/1992 | Japan . |
| 4-61837 | 5/1992 | Japan . |

*Primary Examiner*—Steven N. Meyers
*Assistant Examiner*—Robert G. Santos
*Attorney, Agent, or Firm*—Finnegan, Henderson, Farabow, Garrett & Dunner, L.L.P.

[57] ABSTRACT

In a different nuts assembling construction in which according to the kind of nuts 71, 73, there are provided plural pairs of nut fitting grooves 61, 63 into which both sides of seats 75, 77 of nuts 71, 73 are fitted, the thicknesses D1, D2 of seats 75, 77 of nuts 71, 73 are formed in a manner to be different for each kind of the nuts 71, 73; and the groove thicknesses of the nut fitting grooves 61, 63 are formed by being matched to the thicknesses D1, D2 of corresponding seats 75, 77, so that where an attempt is made to fit the 71, 73 into wrong nut fitting grooves 61, 63, the thicknesses D1, D2 of the seats 75, 77 are not matched to the groove thicknesses of the nut fitting grooves 61, 63, whereby a worker can easily detect that the kind of the nuts 71, 73 is wrong.

4 Claims, 3 Drawing Sheets

TIGHTENING TYPE CONNECTOR HAVING DIFFERENT SIZE NUTS

BACKGROUND OF THE INVENTION

1. Field of the Invention

The present invention relates to a different nuts assembling construction in which seats of different nuts are fitted into plural pairs of nut fitting grooves.

2. Description of the Related Art

Generally, where an electric connection box is connected to a battery power source, or connectors for a large current are connected with each other, there has been used a so-called tightening-type connector by which a connector terminal and a mating terminal are tightened and fixed by terminal connecting bolts in order to obtain securely an electrically connected state. A fusible connector (hereinafter called the FL connector) has been well known as an example of such a tightening-type connector.

A conventional nut assembling construction in the FL connector is disclosed in the publication of Japanese Laid-Open Utility Model No. HEI 4-54417 and that of Japanese Laid-Open Utility Model No. HEI 4-61837. However, in such conventional nut assembling construction, the thicknesses of two nuts are substantially equal to each other, and the groove thicknesses of nut fitting grooves corresponding to seats are also substantially equal to each other, so that there has been a possibility that when the nuts are fitted, a nut having a small outside diameter is fitted by mistake into a nut fitting groove having a large outside diameter.

Such mis-fitting of the nut is not detected until an attempt is made to tighten a terminal connecting bolt to a nut so as to connect conductively a plate terminal to a fuse terminal, so that in a process of connecting the plate terminal, the FL connector must be removed from a connector connecting part to fit the nut again, thereby causing the connecting work to become complex.

Particularly, where nuts are press fitted, the nuts must be press fitted again by a jig, whereby a workability in connecting a plate terminal can be deteriorated.

SUMMARY OF THE INVENTION

With consideration of the above-mentioned circumstances, an object of the present invention is to provide a nut assembling construction capable of preventing easily a mis-assembling of a nut.

An invention is characterized in that in a nut assembling construction in which according to the kind of nuts, there are provided plural pairs of nut fitting grooves into which both sides of seats of nuts are fitted, the thicknesses of seats of the above-mentioned nuts are formed in a manner to be different for each kind of the nuts, and the spacings of the above-mentioned pair of the nut fitting grooves are formed by being matched to the thicknesses of seats corresponding to the nut fitting grooves.

The invention is further characterized in that the breadths of seats of the above-mentioned nuts are formed in a manner to be different according to the kind of the nuts, the thickness of a seat having a small breadth of the nuts is formed in a manner to be thicker than that of a seat having a large breadth, and the spacings of the above-mentioned pair of the nut fitting grooves are formed by being matched to the breadths of seats corresponding to the nut fitting grooves.

In the invention as set forth above, where an attempt is made to fit a nut into a wrong nut fitting groove, the thickness of the seat is not matched to the groove thickness of the nut fitting groove, so that a worker can easily detect that the kind of the nut is wrong.

In the invention as set forth above, in addition to the function of the invention, where an attempt is made to fit a nut of the seat having a large breadth into a wrong nut fitting groove, the spacing of the nut fitting grooves is small, so that the nut cannot be fitted, while where an attempt is made to fit a nut of the seat having a small breadth in a wrong nut fitting groove, the groove width of the nut fitting grooves is small, so that the nut cannot be fitted, whereby a mis-assembling of a nut can be completely prevented.

BRIEF DESCRIPTION OF THE DRAWINGS

FIGS. 4A, 4B are front views showing shapes of different kinds of nuts, in which FIG. 4A shows a nut of M6, while FIG. 4B shows a nut of M5.

DETAILED DESCRIPTION OF THE PREFERRED EMBODIMENTS

With reference to FIGS. 1 through 4B, an embodiment of the present invention will be explained hereinafter.

Figure 1:
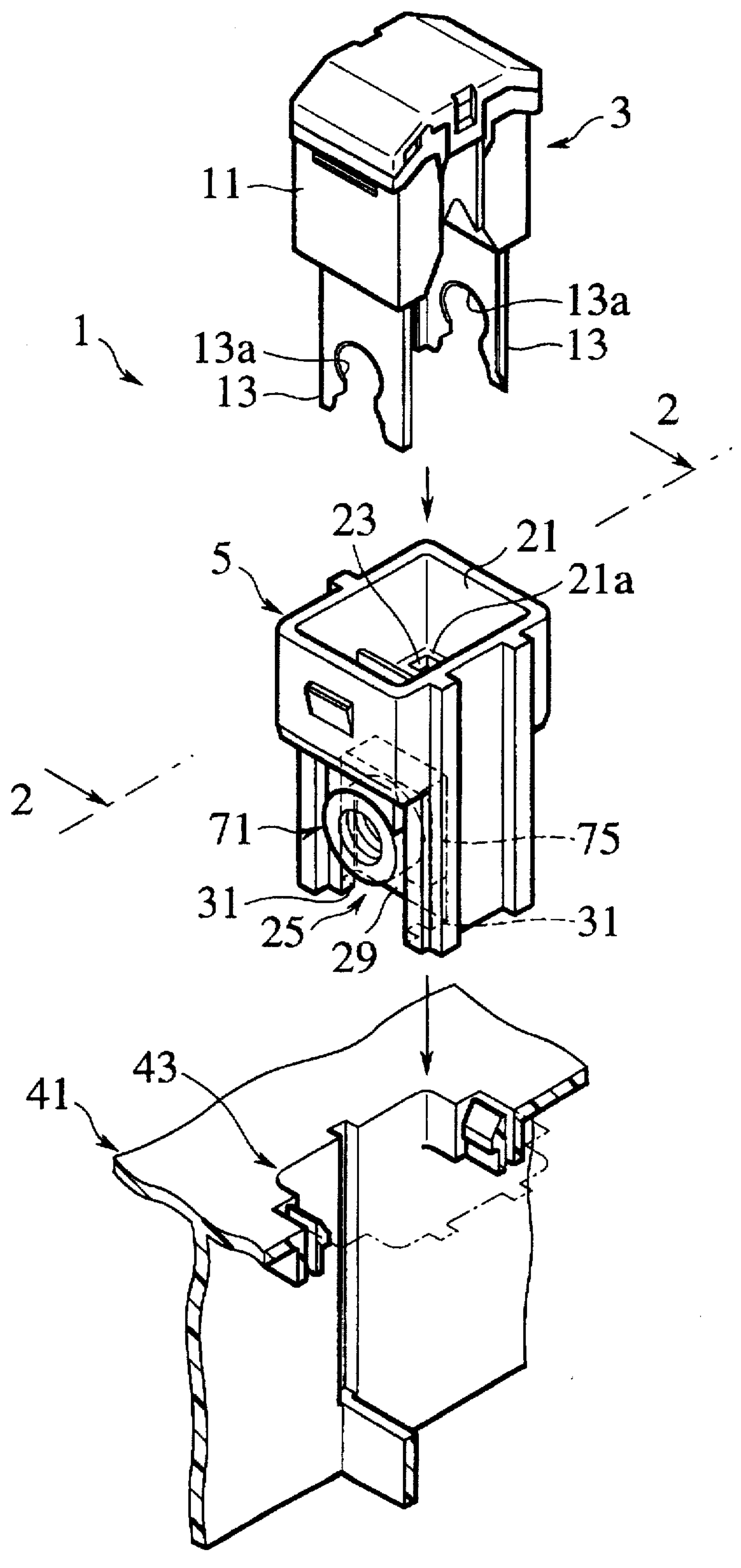
FIG. 1 is an exploded perspective view of an embodiment of the present invention.

As shown in FIG. 1, a fusible link 3 is formed of a synthetic resin case 11 for covering a fusing part (not shown) to protect, and a pair of connector terminals 13 extending from the lower part of the case 11, the connector terminals 13 being formed with bolt insert-through grooves 13*a*.

Provided on the upper part of an insulation housing 5 is a fusible link housing recess 21 opened upward, and formed on a bottom 21*a* is a pair of terminal insert-through holes 23 corresponding to the connector terminals 13. When the connector terminals 13 are matched to the terminal insert-through holes 23, and the fusible link 3 is moved to the insulation housing 5 side (downward in FIG. 2), a state is established in which the fusible link 3 is housed in the insulation housing 5.

Figure 2:
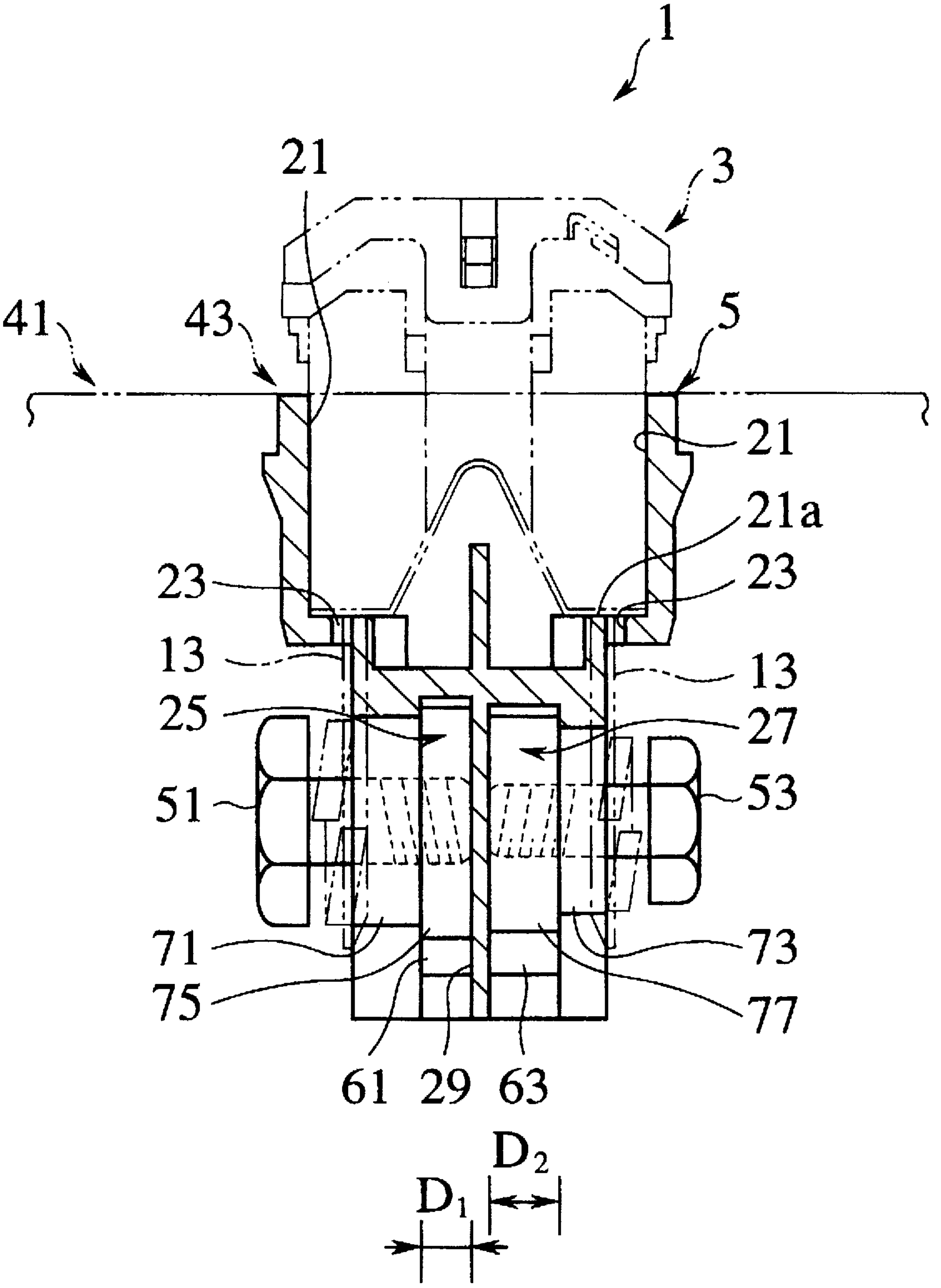
FIG. 2 is a sectional view showing the embodiment of the present invention.

As shown in FIG. 2, the terminal insert-through holes 23 penetrate through upward/downward, and both the sides of the insulation housing 5 below the terminal insert-through holes 23 are provided with respective nut fitting parts 25, 27. The two nut fitting parts 25, 27 are provided on the front and back surfaces of an intermediate wall 29, and as shown in FIG. 2, the nut fitting parts 25, 27 are provided with respective pair of nut fitting grooves 61, 63 which are opposite to each other (the nut fitting part 27 and the nut fitting groove 63 being shown in FIG. 2).

Figure 4A:
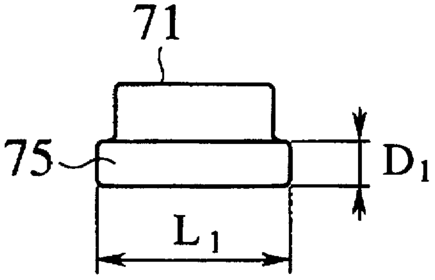
Figure 4B:
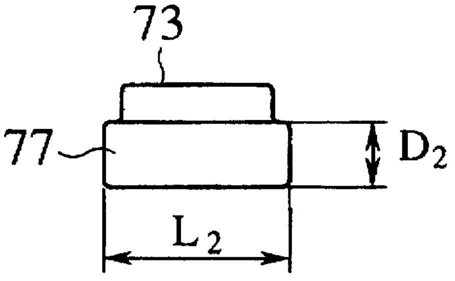

As shown in FIGS. 4A and 4B, the above-mentioned nuts 71, 73 are set in thread diameter at different dimensions in such a manner that, for example, one nut 71 has a thread diameter M6, while the other nut 73 has a thread diameter M5 so as to be matched to the capacity of a conducted current and to prevent a mis-assembling of a connected plate terminal (not shown). Protrusively provided on the outer periphery of the nut 71, 73 are seats 75, 77 fitted into the nut fitting grooves 61, 63. The breadths (L1, L2) of the seats 75, 77 of the nut 71, 73 are formed in such a manner that the breadth of the nut 71 of M6 is larger than that of the nut 73 of M5 (L1>L2).

The thickness (D2) of the seat 77 of the nut 73 having the small-breadth thread diameter M5 is formed in a manner to be thicker than the thickness (D1) of the seat 75 of the nut 71 having the large-breadth thread diameter M6.

Figure 3:
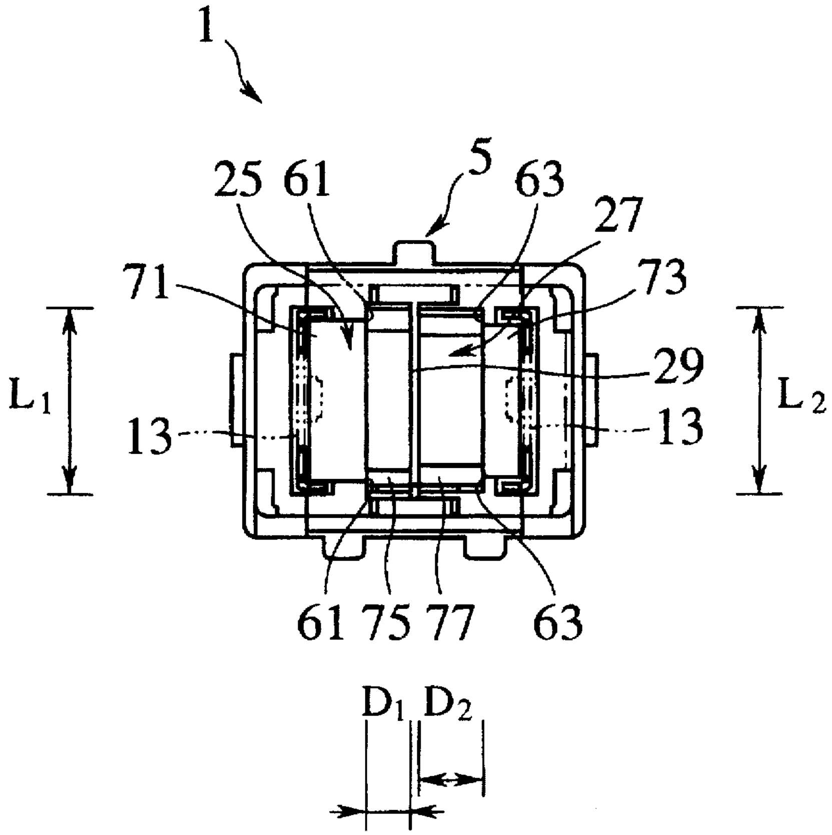
FIG. 3 is a bottom plan view of FIG. 2.

As shown in FIG. 3, the spacings of the pair of the nut fitting grooves 61, 63 are formed into dimensional shapes matched to the breadths (L1, L2) of the seats 75, 77 of the nut 71, 73 to be fitted, while the groove thicknesses of the nut fitting grooves 61, 63 are formed in a manner to be mismatched to the thicknesses (D1, D2) of the seats 75, 77.

As shown in FIG. 2, the FL connector 1 is configured by the fusible link 3, the insulation housing 5 and the pair of the nuts 71, 73 (the nut 73 being shown in FIG. 2).

The function will be explained hereinafter.

As shown in FIG. 2, when both the sides of the seats 75, 77 are fitted into the nut fitting grooves 61, 63, and the nuts 71, 73 are moved from the lower side to the insulation housing 5 side, the nuts 71, 73 are inserted along the front and back surfaces of the intermediate wall 29. The spacings of the nut fitting grooves 61, 63 opposite to each other are formed in a manner to be slightly smaller than the breadths of the seats 75, 77 to prevent the inserted nuts 71, 73 from being rotated, so that the insertion of the nuts 71, 73 is performed by a so-called press inserting by the use of a jig.

In this manner, the nuts 71, 73 are fitted into the nut fitting grooves 61, 63, and the fusible link 3 is mounted in the fusible link housing recess 21, whereby the FL connector 1 is assembled. The FL connector 1 thus assembled is inserted and mounted in a connector connecting part 43 of an electric connection box 41 and the like, and plate terminals (not shown) are conductively connected to respective fuse terminals 13 of the FL connector 1. The plate terminals are tightened and fixed to the outer side of the fuse terminals 13 by terminal connecting bolts 51, 53 threadly engaged with the nuts 71, 73.

Where, in press fitting of the nuts 71, 73 in such a series of works, an attempt is made to fit the nuts 71, 73 into wrong nut fitting grooves 61, 63, the thicknesses (D1, D2) of the seats 75, 77 are not matched to the groove thicknesses of the nut fitting grooves 61, 63, so that a worker can easily detect that the kind of the nuts 71, 73 is wrong. Specifically, where an attempt is made to fit the nut 71 of M6 by mistake into the nut fitting groove 63 for M5, the spacing of the nut fitting groove 63 is small compared to the breadth (L1) of the seat 75, so that the nut 71 cannot be fitted, while where an attempt is made to fit the nut 73 of M5 into the nut fitting groove 61 for M6, the groove width of the nut fitting groove 61 is small compared to the thickness (D2) of the seat 77, so that the nut 73 cannot be fitted. Accordingly, a mis-assembling of the nuts 71, 73 can be completely prevented.

This allows the assembling of wrong kind of the nuts 71, 73, when press fitted, to be easily and securely prevented by a simple construction, whereby a workability in assembling the nuts 71, 73 and in tightening the terminal connecting bolts 51, 53 can be improved.

What is claimed is:

1. A connector comprising:

a fusible link;

a housing configured to receive said fusible link, said housing defining first and second nut-fitting grooves for receiving bolts to anchor said fusible link in said housing, said first nut-fitting groove having a first thickness and said second nut-fitting groove having a second thickness, the second thickness being greater than the first thickness; and first and second nuts insertable into said first and second nut-fitting grooves, respectively, said first nut including a first seat and said second nut including a second seat, said first seat having a thickness substantially equal to the first thickness, and said second seat having a thickness substantially equal to the second thickness.

2. The connector of claim 1, wherein the first thickness of said first nut-fitting groove is slightly smaller than the thickness of said first seat and the second thickness of said second nut-fitting groove is slightly smaller than the thickness of said second seat.

3. The connector of claim 1, wherein said first seat has a first breadth, and said second seat has a second breadth that is less than the first breadth.

4. The connector of claim 3, wherein the first thickness of said first nut-fitting groove is smaller than the first breadth, and the second thickness of said second nut-fitting groove is smaller than the second breadth.

* * * * *